United States Patent
Craft

(10) Patent No.: US 6,304,933 B1
(45) Date of Patent: Oct. 16, 2001

(54) METHOD AND APPARATUS FOR TRANSMITTING DATA ON A BUS

(75) Inventor: David John Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,761

(22) Filed: Mar. 2, 1999

(51) Int. Cl.[7] ...................................................... G06F 13/00

(52) U.S. Cl. ............................................ 710/114; 710/113

(58) Field of Search ..................................... 710/107–125, 710/8–14

(56) References Cited

U.S. PATENT DOCUMENTS 5,901,297 * 5/1999 Fisch et al. ........................ 710/115

* cited by examiner

Primary Examiner—David Wiley
(74) Attorney, Agent, or Firm—Casimer K. Salys; Bracewell & Patterson, L.L.P.

(57) ABSTRACT

A method for transmitting data on a bus having multiple data lines is disclosed. Each of the data lines within the bus is assigned a unique binary value. During data transmissions, only one of the data lines within the bus is activated at a time, and each activation of one of the data lines represents its associated unique binary value. Thus, an aggregate of consecutive activations represents the same information as if the data were transmitted in parallel.

20 Claims, 3 Drawing Sheets

METHOD AND APPARATUS FOR TRANSMITTING DATA ON A BUS

BACKGROUND OF THE INVENTION

1. Technical Field

The present invention relates to a method and apparatus for data transmission in general, and in particular to a method and apparatus for transmitting data on a bus. Still more particularly, the present invention relates to a method and apparatus for transmitting data on a bus connected either as separately packaged chips or as separate areas within a chip.

2. Description of the Prior Art

The technique of using a group of wires typically known as a bus to transmit data has been in common use since the early days of electronic computers. There are many advantages in using a single interconnecting scheme such as a bus for a computer system. For example, various subsystems within a computer system can be interfaced with each other via a bus. In addition, new devices and peripherals can easily be added or even be ported between computer systems that use a common bus. Furthermore, because a single set of wires can be shared among multiple sources and destinations, the cost associated with a bus implementation is relatively low.

However, for computer systems that are specifically designed for business applications, where the demands on input and output are relatively high, it is a major challenge to design a bus system capable of meeting these demands in an efficient manner. With conventional design, data is generally driven on to a bus, using logic voltage levels to encode and transmit a data bit in every wire within the bus, and this method of data transmission is sufficient for relatively narrow buses. But when wider buses are needed to meet the ever increasing throughput requirements, the problem of capacitive and inductive coupling between adjacent parallel bus wires and simultaneous switching of a large number of drivers with consequent peak current demand, becomes more significant. This is especially true for bus wiring within a chip as capacitive and resistive effects are much larger in such an environment due to the small dimensions of the bus wires and the close proximity of wire spacings from adjacent conductors. The present disclosure provides an improved method and apparatus for transmitting data on a bus such that these problems can be greatly reduced.

SUMMARY OF THE INVENTION

In accordance with a method and apparatus of the present invention, a bus includes multiple data lines. Each of the data lines within the bus is assigned a unique binary value. During data transmissions, only one of the data lines within the bus is activated at a time, and each activation of one of the data lines represents its associated unique binary value. Thus, an aggregate of consecutive activations represents the same information as if the data were transmitted in parallel.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Transition Coding Scheme

In accordance with a preferred embodiment of the present invention, for a bus having multiple data lines, only one of the data lines is activated at a time for data transmission, while the remaining data lines are not activated (or in a dormant state in which the data lines are inactive). More precisely, this activation refers to a change of state of a single bus line within the bus. In a preferred embodiment, the number of bits of information conveyed by this state change depends on the number of data lines within the bus. Taking a four-bit wide bus (i.e., a bus having four data lines) as an example, each bus line within the bus is first denoted by a unique binary value as follows: line 1-"00," line 2-"01," line 3-"10," and line 4-"11." During data transmission, instead of driving every bus line on the bus as is done in the prior art, only one bus line will be activated at a time. The activated bus line represents part or all of the data to be transmitted. Thus, in order to send an eight-bit address such as 1001 1100, line 3 will be activated in the first cycle to transmit "10," then line 2 will be activated in the second cycle to transmit "01," then line 4 will be activated in the third cycle to transmit "11," and finally, line 1 will be activated in the forth cycle to transmit "00." It is noted that four cycles (or four separate transitions) are required for transmitting an eight-bit address.

Table I shows the number of bits of data that can be conveyed via a single transition, for various bus sizes. Table I also shows the number of consecutive single transitions needed to convey the same number of bits of data as the width of the bus (in other words, to transfer the same amount of data as a conventional bus of the same width). For example, with a bus of four wires, only two bits of data can be conveyed via a single transition, thus two consecutive transitions are needed to send four bits of data; and with a bus of 16 wires, only four bits of data can be conveyed via a single transition, so four consecutive transitions are required to send 16 bits of data.

TABLE I

| bus size (number of data data lines) | data bits per transition | transitions for group-size bits |
|---|---|---|
| 2 data lines | 1 bit | 2 transitions |
| 4 data lines | 2 bits | 2 transitions |
| 16 data lines | 4 bits | 4 transitions |
| 256 data lines | 8 bits | 32 transitions |

The bus sizes shown in Table I are only exemplary and not exhaustive. The bus sizes not shown in Table I are generally not a convenient fit for computer or data processing system requirements; however, one possible exception may be a bus size of eight data lines, with each transition sending three bits of data. Thus, for a system that utilizes byte parity, three such transitions send 9 bits, which is very convenient for an 8-bit byte of data plus one parity bit.

B. Exemplary Implementation

Figure 1:
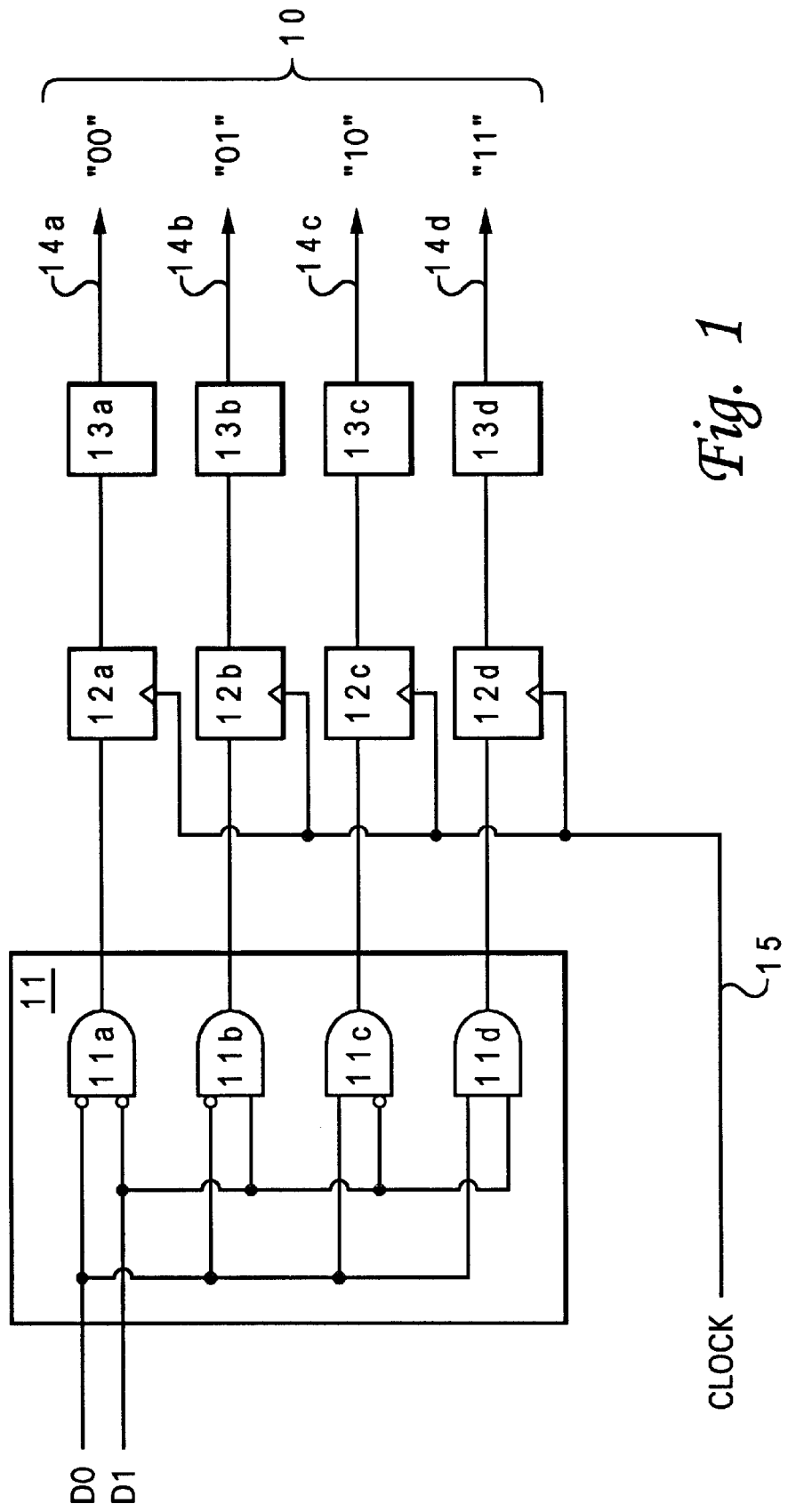
FIG. 1 is an exemplary implementation of a bus having a bus size of four, in accordance with a preferred embodiment of the present invention.

Referring now to the drawings and in particular to FIG. 1, there is depicted an exemplary implementation of a bus 10 having a bus width of four data lines, in accordance with a preferred embodiment of the present invention. Data inputs D0 and D1 are initially sent to a decoder 11 that preferably includes four two-input AND gates 11a–11d with different negated inputs as shown in FIG. 1. The logic within decoder 11 ensures that only one of output lines 14a–14d can be activated in each clock cycle. Each output from AND gates 11a–11d is coupled to an input of a respective one of latches 12a–12d. Latches 12a–12d are preferably D flip-flops clocked by a clock signal 15. Each output from latches 12a–12d is then respectively coupled to one of drivers 13a–13d. In this exemplary embodiment, output lines 14a–14d from drivers 13a–13d represent binary values "00," "01," "10," and "11," respectively.

C. Data Propagation

The transition coding scheme, as mentioned above, is preferably implemented as a self-clocking transmission scheme with multiple repeaters coupled between a sending device and a receiving device; but it is possible for a transition to get out of order on long paths if one path between the repeaters is much faster than the others. One simple solution to this problem is to use a transmission rate that is slow enough to ensure each transitional-coded value always arrives at every respective receiving device, even under the worst case tolerance, before launching the next transitional-coded value.

Figure 2:
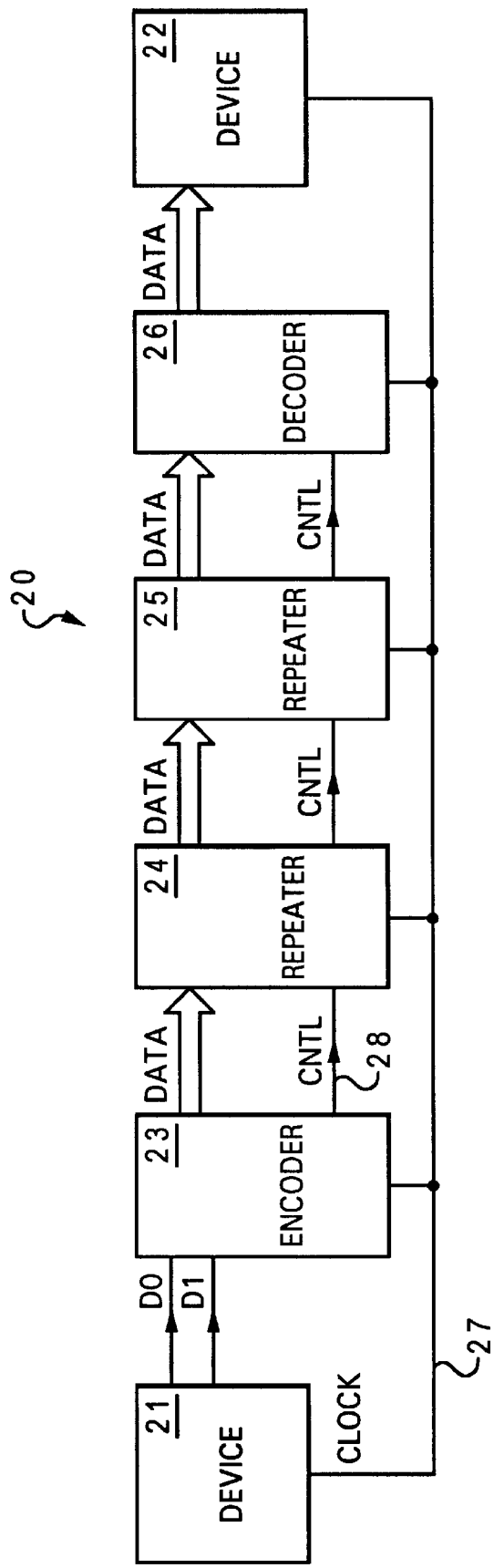
FIG. 2 is a block diagram of a synchronous transmission system in accordance with a preferred embodiment is of the present invention.

With reference now to FIG. 2, there is illustrated a block diagram of a synchronous transmission system in accordance with a preferred embodiment of the present invention. As shown, synchronous transmission system 20 includes an encoder 23, repeaters 24, 25, and a decoder 26. Data is synchronously transmitted from sending device 21 to receiving device 22. Synchronous transmission system 20 requires some form of synchronization among all the repeaters, thus a distributed clock 27 is fed into each of repeaters 24 and 25 via a respective clock-in terminal. With this embodiment, if the maximum separation between blocks (i.e., encoder 23, repeaters 24, 25, and decoder 26) is designed to be 2 mm and the delay is 263 picoseconds, for example, then a total period for clock signals might be chosen to be 600 picoseconds, with 300 picoseconds on the up cycle and 300 picoseconds on the down cycle. If the encoders and repeaters operate on either the rising or falling edges of clock 27, this allots 300 picoseconds between successive transitions from encoder 23, allowing this same data propagation time along a path between any two blocks. As two bits of data are sent per transition, this gives a data rate of 4 bits in 600 picoseconds, or about 800 Mbyte/second, with an initial delay of 900 picoseconds.

A control line 28 can be utilized for performing a RESET function. For example, if control line 28 is asserted when the signal from clock 27 is down, such assertion signals the start of a data transfer at the next clock transition (i.e., the signal from clock 27 is up). If control line 28 is asserted when the signal from clock 27 is up, such assertion initiates a RESET function, which also propagates as a control signal after the signal from clock 27 is up, thus propagating the RESET signal onward.

The above-described synchronous transmission scheme notwithstanding, if interlocking is performed at each repeater between a sending device and a receiving device, it is possible to transmit data without regard to the individual transmission delays because the next sequential data can be sent once the preceding data is safely locked into a repeater.

Figure 3:
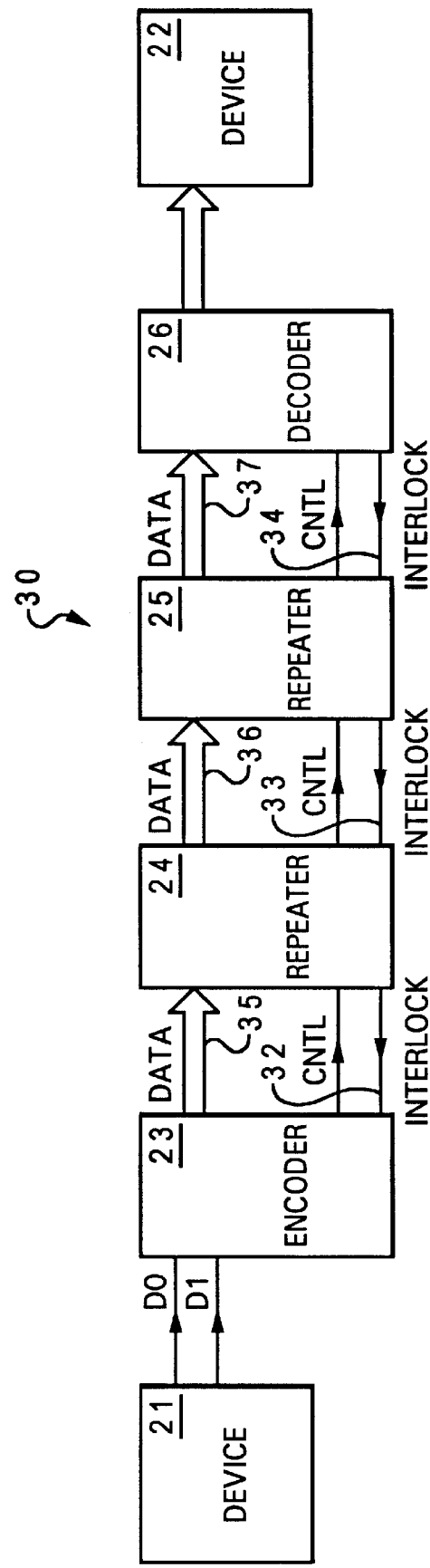
FIG. 3 is a block diagram of an asynchronous transmission system in accordance with a preferred embodiment of the present invention.

Referring now to FIG. 3, there is illustrated a block diagram of an asynchronous transmission system having an interlocking mechanism, in accordance with a preferred embodiment of the present invention. Similar blocks as shown in FIG. 2 can be utilized to configure an asynchronous transmission system 30 for transmitting transitional-encoded data. As shown in FIG. 3, there are three interlock control lines 32, 33, and 34, connecting encoder 23 and repeater 24, repeater 24 and repeater 25, and repeater 25 and decoder 26, respectively.

Data transmission begins when encoder 23 drives a first transitional-coded value on data path 35. The first transitional-coded value arrives at one of the data-in terminals of repeater 24 after a propagation delay D. After the receipt of the first transitional-coded value by repeater 24, an interlock control signal is then sent back to encoder 23 via interlock control line 32 after a small intra-block delay d. Propagation delays D are assumed to be the same for data and interlock signals in either direction. The interlock control signal from interlock control line 32 causes encoder 23 to drive a second transitional-coded value onto data path 35 after an intra-block delay d, at the same time as repeater 24 transfers the first transitional-coded value to data path 36.

After the receipt of the first transitional-coded value by repeater 25, an interlock control signal is sent back to repeater 24 via interlock control line 33 after an intra-block delay d. The interlock control signal from interlock control line 33 then causes repeater 24 to drive the second transitional-coded value onto data path 36 after an intra-block delay d, at the same time encoder 23 transfers a third transitional-coded value to data path 35 after a return interlock signal has been received from repeater 24 via interlock control line 32 signifying the receipt of the second transitional-coded value.

The process continues in this fashion, until the data transfer is complete. In this exemplary implementation, a delay of approximately 2*(D+d) is required for transmitting every two data bits. Assuming (D+d) to be approximately 300 picoseconds, the data transmission rate for this exemplary asynchronous transmission scheme works out to be approximately 400 MBytes/second.

As has been described, the present invention provides an improved method and apparatus for transmitting data on a bus. With the present invention, significant advantages in terms of reducing power dissipation and peak driver current demand can be achieved, both for inter-chip and intra-chip communications. The asynchronous nature of transition encoding scheme also has other advantages, for example, it allows extremely high data transmission rates to be obtained, using mono-directional point-to-point topology, with an interlocking repeater approach. As a result, an eight-bit wide bus can attain data transmission rates of up to 1 Gigabyte/second with the current complementary metal oxide semiconductor (CMOS) technology. In addition, only a small number of control lines is required to implement the repeater interlock for asynchronous transmission.

While the invention has been particularly shown and described with reference to a preferred embodiment, it will be understood by those skilled in the art that various changes in form and detail may be made therein without departing from the spirit and scope of the invention.

What is claimed is:

1. A method for transmitting data on a bus between a first device and a second device, wherein said bus includes a plurality of data lines, said method comprising the steps of:

assigning each of said plurality of data lines within said bus a unique binary value;

transitioning less than all of said plurality of data lines for each data transmission between said first device and said second device, wherein each transition of a data line represents a transmission of its associated unique binary value; and performing a plurality of consecutive transitions, wherein an aggregate of said consecutive transitions represents information in data when the data are transmitted within said bus in parallel.

2. The method according to claim 1, wherein said activating step further includes a step of activating only one of said plurality of data lines for each data transmission.

3. The method according to claim 1, wherein a number of bits per transition approximately equals $\log_2$(number of said plurality of data lines).

4. The method according to claim 1, wherein said plurality of data lines includes at least three data lines.

5. The method according to claim 1, wherein said transitioning step is performed synchronously.

6. The method according to claim 1, wherein said transitioning step is performed asynchronously.

7. The method according to claim 1, wherein said method further includes a step of decoding transitioned data lines in accordance with their respective assigned unique binary value.

8. An apparatus for transmitting data on a bus between a first device and a second device, wherein said bus includes a plurality of data lines, said apparatus comprising:

means for assigning each of said plurality of data lines within said bus a unique binary value;

means for transitioning less than all of said plurality of data lines for each data transmission between said first device and said second device, wherein each transition of a data line represents a transmission of its associated unique binary value; and means for performing a plurality of consecutive transitions, wherein an aggregate of said consecutive transitions represents information in data when the data are transmitted within said bus in parallel.

9. The apparatus according to claim 8, wherein said transitioning means further includes a means for transitioning only one of said plurality of data lines for each data transmission.

10. The apparatus according to claim 8, wherein a number of bits per transition approximately equals $\log_2$(number of said plurality of data lines).

11. The apparatus according to claim 8, wherein said plurality of data lines includes at least three data lines.

12. The apparatus according to claim 8, wherein said transitioning means is performed synchronously.

13. The apparatus according to claim 8, wherein said transitioning means is performed asynchronously.

14. The apparatus according to claim 8, wherein said apparatus further includes a means for decoding activated data lines in accordance with their respective assigned unique binary value.

15. A data processing system capable of transmitting data on a bus, said data processing system comprising:

a plurality of devices coupled to each other via said bus, wherein said bus includes a plurality of data lines;

means for assigning each of said plurality of data lines within said bus a unique binary value;

means for transitioning less than all of said plurality of data lines for each data transmission between a first device and a second device, wherein each transition of a data line represents a transmission of its associated unique binary value; and means for performing a plurality of consecutive transitions, wherein an aggregate of said consecutive transitions represents information in data when the data are transmitted within said bus in parallel.

16. The data processing system according to claim 15, wherein said transitioning means further includes a means for transitioning only one of said plurality of data lines for each data transmission.

17. The data processing system according to claim 15, wherein a number of bits per transition approximately equals $\log_2$(number of said plurality of data lines).

18. The data processing system according to claim 15, wherein said plurality of data lines includes at least three data lines.

19. The data processing system according to claim 15, wherein said transitioning means is performed synchronously.

20. The data processing system according to claim 15, wherein said transitioning means is performed asynchronously.

* * * * *